UNITED STATES PATENT OFFICE.

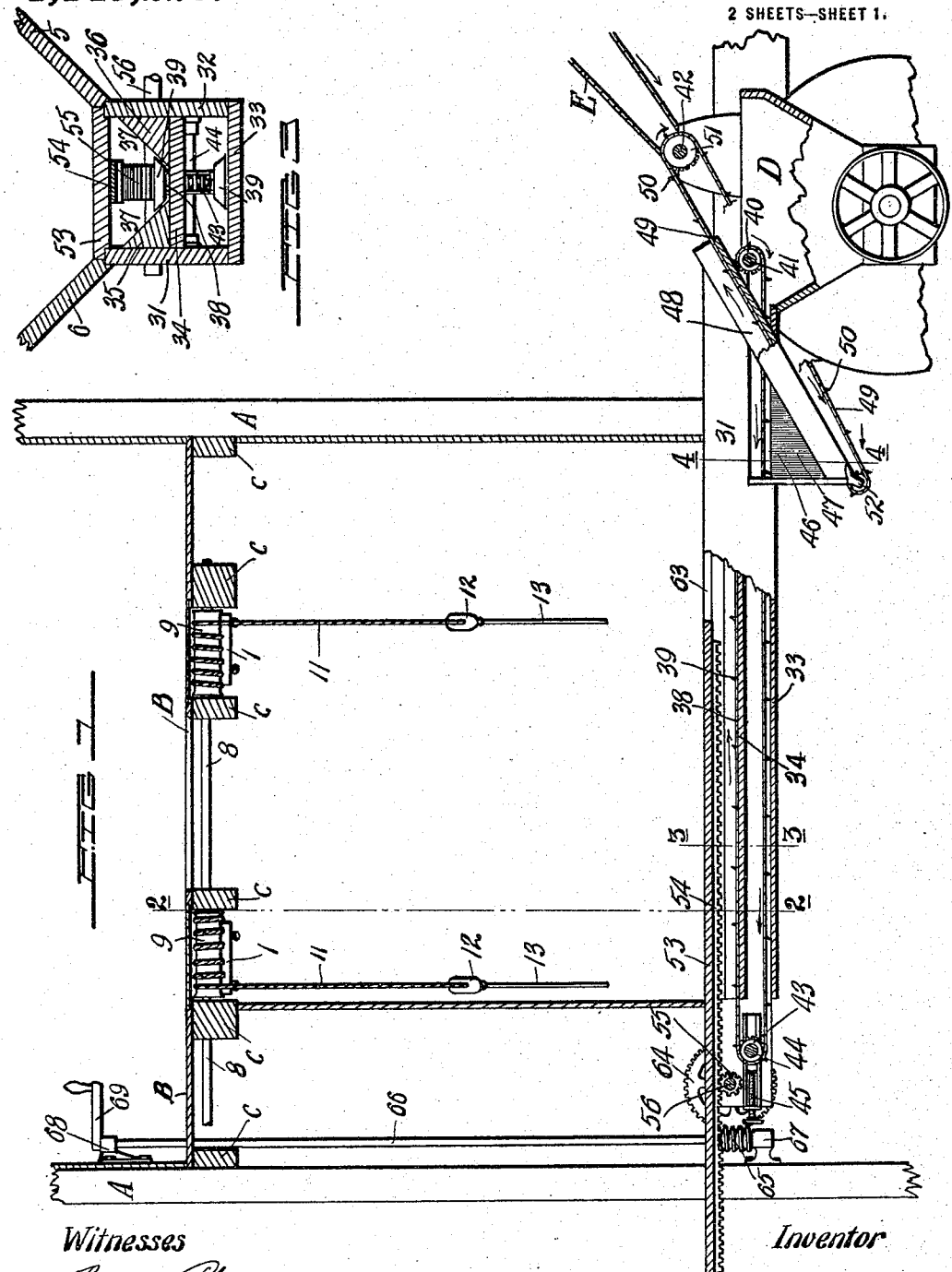

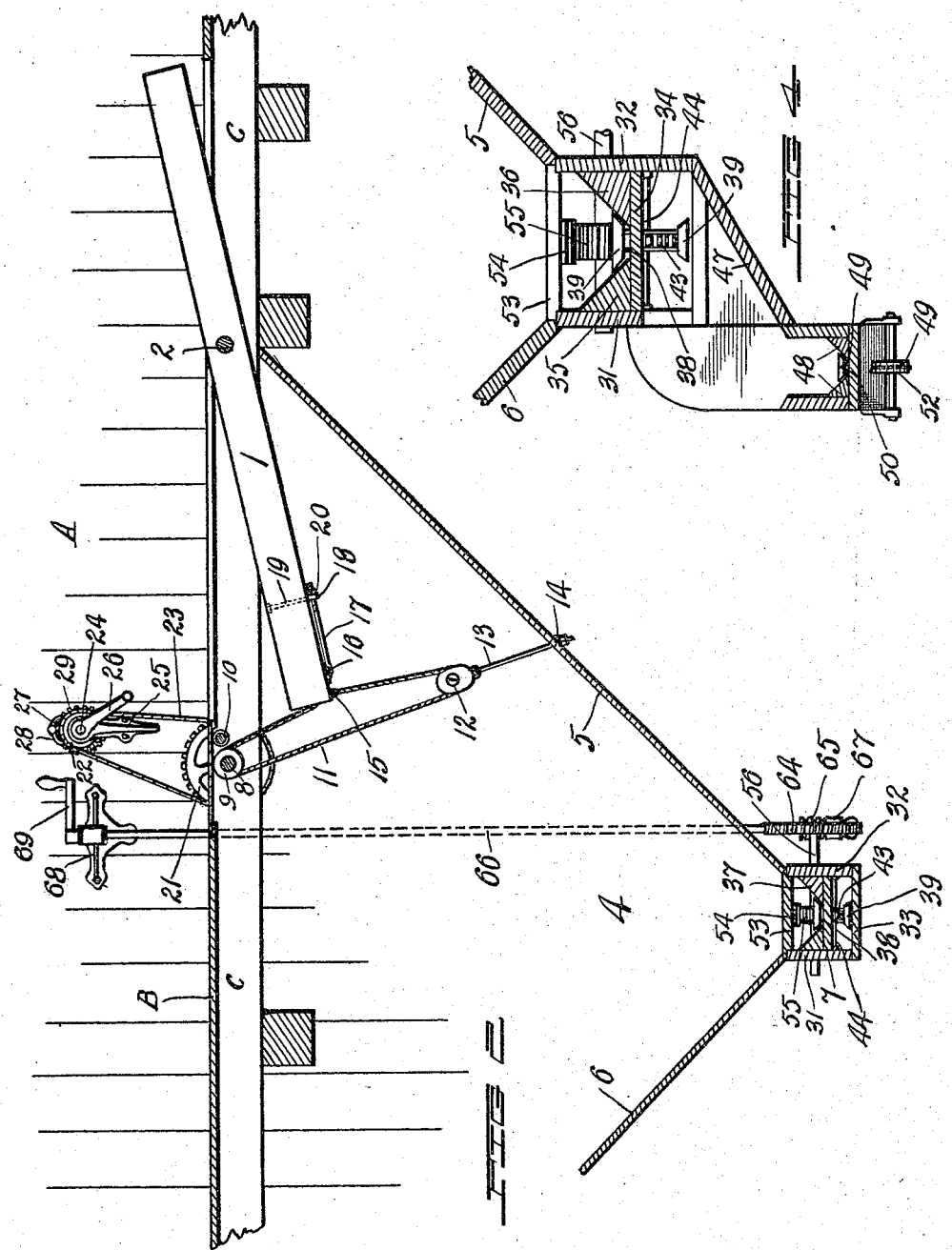

FREDERICK J. ZIMMERMAN, OF ATHENS, ILLINOIS.

GRAIN-ELEVATOR WAGON-DUMP AND CONVEYER MECHANISM.

1,145,223.     Specification of Letters Patent.     Patented July 6, 1915.

Original application filed May 12, 1910, Serial No. 560,875. Divided and this application filed September 6, 1910. Serial No. 580,776.

*To all whom it may concern:*

Be it known that I, FREDERICK J. ZIMMERMAN, a citizen of the United States, residing at Athens, in the county of Menard and State of Illinois, have invented certain new and useful Improvements in Grain-Elevator Wagon-Dump and Conveyer Mechanism, of which the following is a specification.

This invention has reference to a new and improved grain dump and dump conveyer for use in an elevator, and refers more particularly to a type of manually controlled dump logs; and to a conveyer in which the chain returns underneath the conveyer trough.

An object of the present invention is to provide an adjustable means for covering the conveyer trough, whereby the feed of the grain into the trough may be regulated, thus making it unnecessary for the conveyer chain to drag through the grain for the entire length of the grain bin.

This invention has for a still further object a means for making it practical to return the conveyer chain underneath the trough instead of above through the bin as is the present custom; said means consisting of a small auxiliary conveyer attached at one end and to one side of the main drag trough for catching the grain that is "slobbered" by the main conveyer and returning the same to the hopper into which the main conveyer is feeding.

For a more complete and thorough understanding of this invention, reference is had to the accompanying drawings, in which—

Figure 1 is a sectional view taken through the dump bin, parts being shown in section, parts in elevation, and parts broken away, in order to more clearly show the details of the device, the dump logs being here shown in their horizontal position and the conveyer trough cover being partly closed; Fig. 2 is a longitudinal section of the dump as the same would appear if taken on the line 2—2 of Fig. 1, the dump logs being shown in the lowered position; Fig. 3 is an enlarged section of the main conveyer drag as the same would appear if taken on the line 3—3 of Fig. 1, looking in the direction of the arrow; and Fig. 4 is an enlarged section as the same would appear on the line 4—4 of Fig. 1, looking in the direction of the arrow, showing the auxiliary conveyer.

Like characters of reference indicate corresponding parts throughout the figures.

This application is a division of the application filed by me on May 12, 1910, bearing Serial No. 560,875.

In the drawings A A represent the side walls of the driveway of an elevator, and B indicates the flooring of the driveway supported on beams or joists C. The two wagon dump logs 1 are pivoted at 2, each between two of the beams C. The rear ends 3 of the dump logs 1 extend over the grain dump bin 4, so that when a wagon is placed on the dump logs 1 and dumped, the grain will run directly into the bin 4. Said bin has the sloping sides 5 and 6, the side 5 extending up under the dump logs 1. At the bottom of the bin 4 is the conveyer trough 7 to be described.

Adjacent the rear ends 3 of the dump logs 1 and lying in a transverse direction to the extent of said dump logs, is a shaft 8 which is journaled in the beams C. Wooden drums 9, one for each dump log 1, are immovably carried on said shaft 8. Just enough space is left between said drums 9 and the rear ends 3 of said dump logs 1 to allow the presence of rollers 10, one for each of said dump logs, said rollers 10 being provided for the wheels of the wagon to ride against as the dump is lowered. Cables 11, which are preferably Swedish wire tiller rope or some similar pliable wire cable, are wrapped with a plurality of turns, one cable about each of the drums 9; said plurality of turns being preferably six or more. One end of each of said cables is passed down through a pulley 12, said pulley being secured by means of a rod 13 to the side 5 of the grain bin 4 as at 14. After passing through said pulley 12 said cable 11 is secured on the under side of the end 3 of the dump log 1 to the bolt 15. This end of the cable 11 is the end that leaves the drum 9 on the side farthest removed from the end 3 of the dump log 1. The other end of the cable 11 is brought directly to the under side of the end 3 of the dump log 1 where it is secured to the eye 16 of a bolt 17. The opposite end of bolt 17 passes through an eye 18 of a bolt 19, and is adjustably held in this position by a nut 20 on said bolt 17, the bolt 19 being secured to the dump log 1. It can readily be seen that by tightening the nut 20 the cable 11 can always be kept taut so that there will be no lost motion in its operation.

Carried on one end of shaft 8 and near one of the walls A is the sprocket wheel 21, said sprocket being much larger than a sprocket 22 to which it is connected by the sprocket chain 23. Said sprocket 22 is immovably carried on the short shaft 24 which is journaled in and supported by a bracket 25 attached to the wall A of the elevator driveway. The bracket 25 is preferably placed at a sufficient height above the floor B to allow a person to operate the wagon dump by means of the crank handle 26 on the outer end of shaft 24. Turning the crank 26 to the right will operate the shaft 8 through the sprocket chain connection between sprockets 21 and 22 and cause the cables 11 to be drawn up on the side of the drums opposite the dump logs 1, thus causing the ends 3 of the dump logs to be lowered to dump the grain from the wagon. To raise the dump logs to a horizontal position again the crank 26 is operated to the left thus raising the logs entirely by manual power and giving the operation of the entire mechanism into complete control of the operator in case of accident, and at the same time eliminating any sudden jolting or jarring of the wagon.

Two separably operated dogs 27 and 28 are secured to the bracket 25 and are arranged to have engagement with the straight toothed ratchet wheel 29, when thrown into locking position, said wheel 29 being secured to the shaft 24, one dog locking shaft 24 against rotation in one direction and the other preventing its turning in the opposite direction. It is thus possible to quickly and easily lock the dump logs in any desired position by locking the shaft 24 against rotation.

It can easily be seen that by the use of cables as operating means for lowering and raising the dump logs, it becomes unnecessary to place a large amount of cumbersome mechanism within the grain bin, or to make the bin smaller to provide a place for this mechanism, and more particularly this structure allows the bin to occupy the very desirable space up under the dump logs. It is apparent that the cables 11 occupy practically no space at all in the grain bin 4, and that the cables and the pulleys 12 would be in no way impaired in their operation, even should grain be closely packed around the same.

The construction described hereinbefore does not form part of the invention to be covered by this application as that is the subject matter of the parent application of which this is a division and is referred to merely for the better understanding of the operation of the mechanism as a whole.

In detail the conveyer trough 7 consists of two side pieces 31 and 32, and the bottom floor or covering 33 forming a conveyer box running entirely across the center of the bottom of the grain bin 4, and extending to the sheller D or to an elevating device where no sheller is used. Intermediate the top and bottom edges of the sides 31 and 32 of the conveyer trough 7 is the main drag floor plank 34 dividing the conveyer box into an upper and lower section. Blocks 35 and 36 having a triangular cross section are placed in the upper section of the conveyer box forming a somewhat V-shaped trough as at 37. Through this trough runs the conveyer chain 38, said chain having attached thereto at regular intervals the lugs or cleats 39. Said chain 38 operates to draw the grain through the trough 37 to the hopper of the sheller D, being operated from the end nearest the said sheller by engagement with sprocket wheel 40 which is carried on shaft 41. Said shaft 41 is operated by having in turn a chain and sprocket connection with a shaft 42, not shown, which shaft is driven by some suitable power, preferably operating through chain E. The chain 38 after discharging the grain into the hopper D rides under on the sprocket 40 and returns through the lower section of the conveyer box 7, traveling on the floor 33. At the opposite end it rides up over an idler sprocket 43 carried on a short shaft 44, said shaft being arranged to be adjustable for the purpose of tightening the chain 38 by any approved means shown as 45. This method of returning the drag chain 38 directly underneath the conveyer trough 37 is contrary to the usual custom, which is to return the chain above through a box in the grain bin 4, the present objection to the under return being that the chain 38 in passing over the sprocket 40 carries with it some of the grain, or as it is commonly expressed, "slobbers." To remedy this the ordinary custom is to run the chain perpendicularly above the hopper for a distance sufficient to cause the grain carried over to be dropped into the hopper. But this ordinary method makes it necessary to return the chain through a box suspended directly in the center of the grain bin, which is a very great inconvenience, and occupies a great amount of valuable space. To make the under return practical a means is provided for conveying the "slobbered" grain to the hopper D, said means consisting of a small auxiliary conveyer attached to one side of the main drag box and near the discharge end thereof. An opening 46 is provided in the floor 33 of the main drag box. As the chain 38 in its return passes over the opening 46 all "slobbered" grain will fall through said opening onto an inclined slide 47, and be deposited thereby into the auxiliary conveyer trough 48. The grain will then be carried up through this trough 48 and deposited into the hopper D by a conveyer chain 49 having cleats or lugs 50, said chain being operated by a sprocket 51 carried on shaft 42, the opposite end of said chain passing over an idler sprocket 52, said chain returning from sprocket 51 to sprocket 52 freely suspended underneath trough 48.

An adjustable sliding cover 53 for trough 37 is arranged to slide with its edges resting each on an upper edge of one of the sides 31 and 32 of the drag box 7. Said cover 53 has attached to its under side and running longitudinally thereof, a rack 54, said rack engaging a pinion 55 carried on a shaft 56. On one end of shaft 56 is fixed a worm gear wheel 64 which is in mesh with the worm 65. Said worm 65 is immovably secured to a shaft 66 which extends up into the elevator driveway. The lower end of shaft 66 bears in bracket 67 and the upper end is carried in the bracket 68 attached to the wall A of the driveway, being preferably the same wall to which is attached the bracket 25. Said bracket 68 is so placed that a person can easily adjust the trough cover 53 by means of a crank 69 secured to the upper end of the shaft 66. By operating the crank 69 the slide 53 can be adjusted to cover as much of the conveyer trough as desired. Thus when the bin 4 is almost full of grain, only a small part of the trough is left open as at 63, thereby permitting only the desired amount of grain to feed into the trough and making it unnecessary for the conveyer chain to drag through the grain for the entire length of the bin. As the bin is emptied of grain the cover 53 can be moved back to allow the grain to continue to feed into the trough until when there is no longer any grain in the bin the entire length of the trough will be uncovered. It is easily seen that this device eliminates much of the wear and tear on the conveyer chain, prevents it from feeding into the hopper faster than desired, and also keeps the drag from choking up and breaking the chain.

The general results attained in an elevator dump of this construction and design are cheapness and simplicity of structure, ease and safety in operation, and convenience in the arrangement and location of the various parts, such as is not successfully attained by any form of device now in use.

Having thus fully described my invention, what I claim and desire to secure by Letters Patent of the United States, is:—

1. In a grain elevator dump conveyer mechanism, in combination, a main conveyer trough, a conveyer chain operating in said trough, for carrying grain to a destined receptacle, a chain return box underneath said trough, through which box said conveyer chain returns, an auxiliary conveyer trough at one end of said main conveyer trough, an opening in said chain return box, a slide beneath said opening whereby grain "slobbered" by said main conveyer will be deposited in said auxiliary conveyer, and a conveyer chain in said auxiliary conveyer trough by which the "slobbered" grain is conveyed to its destined receptacle.

2. In an apparatus of the character described, in combination, a main conveyer trough having its discharge at one end and an auxiliary discharge on the side and near its discharge end, conveying means in said trough, an auxiliary conveyer trough adjacent said main trough and in communication with the auxiliary discharge, and conveying means in said auxiliary trough adapted to convey slobbered material to the same receptacle as said main conveyer.

3. In a conveyer, a conveyer trough having upper and lower runs, the upper run having an end discharge, the lower run having a side discharge, conveying means traversing the upper and lower runs, a conveyer arranged to receive the discharge from the lower run adapted to convey slobbered material to the same receptacle as said main conveyer, and an inclined feed-way from the side discharge to said second conveyer.

4. In an apparatus of the character described, in combination, a main conveyer trough, comprising a box having upper and lower walls, and an intermediate partition forming upper and lower sections, said box being open at one end of the upper section, and being open for a portion of one side of the lower section, conveying means in said trough having an upper run in the upper section of said box, and a lower run in the lower section of said box, an auxiliary conveyer trough adjacent said main trough and in communication with the opening in the side of the lower section of said box, and conveying means in said auxiliary trough adapted to convey slobbered material to the same receptacle as said main conveyer.

5. In an apparatus of the character described, in combination, a main conveyer trough having upper and lower sections, said trough being open at one end of the upper section and being open for a portion of one side of the lower section, a conveyer in said trough having an upper run in the upper section and a lower run in the lower section, an auxiliary conveyer trough, an inclined slide adjacent the opening in the side of the lower section leading to said auxiliary conveyer trough, and a conveyer having a run running through said conveyer trough.

6. In an apparatus of the character described, in combination, a main conveyer trough, comprising a box having side members and top and bottom members, and an intermediate partition between said side members and forming upper and lower sections, the upper section of said box being open at one end, the lower section of said box being open for a portion of one side to permit the discharge of slobbered material, members triangular in cross section positioned on the upper section of said box to form a V-shaped trough converging toward the intermediate member, conveying means in said trough having runs in said upper and lower sections of the box, the upper run moving in the bottom of said V-shaped trough.

7. In an apparatus of the character described, in combination, a main conveyer trough, comprising a box having side members and top and bottom members, and an intermediate partition between said side members and forming upper and lower sections, the upper section of said box being open at one end, the lower section of said box being open for a portion of one side, the bottom of the box being open at its end corresponding to the open side, conveying means in said trough having runs in said upper and lower sections of the box, a slide below said open portion of the bottom member, an auxiliary conveyer trough with which said slide connects, and a conveyer in said auxiliary conveyer trough adapted to convey the slobbered material to the same receptacle as the main conveyer.

In testimony whereof I affix my signature, in presence of two witnesses.

FREDERICK J. ZIMMERMAN.

Witnesses:
Roy Z. McRoun,
Elmer L. Primm.

Copies of this patent may be obtained for five cents each, by addressing the "Commissioner of Patents, Washington, D. C."